(12) United States Patent
Anand et al.

(10) Patent No.: US 9,742,490 B1
(45) Date of Patent: Aug. 22, 2017

(54) SYSTEM AND METHOD FOR AUTOMATIC BANDWIDTH MANAGEMENT

(71) Applicant: Infinera Corporation, Annapolis Junction, MD (US)

(72) Inventors: Madhukar Anand, Fremont, CA (US); Ramesh Iyer, Freemont, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/091,419

(22) Filed: Apr. 5, 2016

(51) Int. Cl.
*H04B 10/00* (2013.01)
*H04B 10/079* (2013.01)
*H04Q 11/00* (2006.01)
*H04J 14/02* (2006.01)

(52) U.S. Cl.
CPC ...... *H04B 10/0795* (2013.01); *H04J 14/0212* (2013.01); *H04Q 11/0066* (2013.01)

(58) Field of Classification Search
CPC .................................................. H04B 10/0795
USPC ...................................... 398/25, 33, 35, 140
See application file for complete search history.

(56) References Cited

U.S. PATENT DOCUMENTS

| | | | | |
|---|---|---|---|---|
| 8,009,985 | B1 * | 8/2011 | Roberts | H04J 3/14 398/47 |
| 8,553,551 | B2 * | 10/2013 | Spector | H04Q 11/0067 370/235 |
| 2009/0169217 | A1 * | 7/2009 | Meagher | H04J 3/047 398/140 |
| 2010/0254709 | A1 * | 10/2010 | Narvaez | H04J 3/062 398/98 |
| 2012/0219288 | A1 * | 8/2012 | Roberts | H04J 3/14 398/33 |
| 2013/0209091 | A1 * | 8/2013 | Mateosky | H04B 10/07953 398/26 |
| 2014/0050106 | A1 * | 2/2014 | McNaughton | H04L 5/0064 370/252 |
| 2014/0269303 | A1 * | 9/2014 | Toy | H04L 47/12 370/235 |
| 2015/0058481 | A1 * | 2/2015 | Miller | H04L 43/0876 709/224 |
| 2015/0117195 | A1 * | 4/2015 | Toy | H04L 47/263 370/232 |
| 2015/0131442 | A1 * | 5/2015 | Racz | H04L 47/22 370/235 |
| 2016/0028586 | A1 * | 1/2016 | Blair | H04B 10/27 398/45 |
| 2016/0028602 | A1 * | 1/2016 | Mishra | H04L 43/0811 370/236.2 |
| 2016/0050119 | A1 * | 2/2016 | Chhabra | H04L 43/0811 370/218 |
| 2016/0050470 | A1 * | 2/2016 | Swinkels | H04Q 11/0062 398/45 |

(Continued)

*Primary Examiner* — Agustin Bello
(74) *Attorney, Agent, or Firm* — Muncy, Geissler, Olds & Lowe, PC; David L. Soltz

(57) ABSTRACT

Systems and methods for automatically managing the bandwidth requirements of application workloads may include learning the bandwidth requirements using historical data, predicting the required bandwidth for a time interval and provisions the services to deliver the appropriate bandwidth to the applications. Systems and methods for automatically managing the bandwidth requirements of application workloads may also include monitoring for the actual bandwidth requirements of the applications and adapt dynamically to changing requirements.

20 Claims, 7 Drawing Sheets

(56) References Cited

U.S. PATENT DOCUMENTS

| | | | |
|---|---|---|---|
| 2016/0080272 A1* | 3/2016 | McNaughton | H04L 41/147 370/230.1 |
| 2016/0134502 A1* | 5/2016 | Edwards | H04L 12/66 370/252 |
| 2016/0142328 A1* | 5/2016 | Toy | H04L 43/0882 370/235 |
| 2016/0183118 A1* | 6/2016 | Liu | H04L 47/823 370/232 |
| 2016/0285532 A1* | 9/2016 | Negus | H04W 4/00 |
| 2016/0380878 A1* | 12/2016 | Bugenhagen | H04L 12/14 370/238 |

* cited by examiner

SYSTEM AND METHOD FOR AUTOMATIC BANDWIDTH MANAGEMENT

FIELD OF DISCLOSURE

This disclosure relates generally to packet optical communication networks and more specifically, but not exclusively, to bandwidth management in packet optical communication networks.

BACKGROUND

Flexible bandwidth and bandwidth calendaring are two emerging applications for data transport services but so far, the effort has been focused on provisioning of services, and this is typically done using a manual intervention. This leads to inefficient usage of network resources, and can also result in sub-optimal performance for the applications using the network.

Currently, much of the industry effort has been focused on provisioning of services that offer data transport services, but the management of bandwidth requirement still requires manual intervention, and does not change based on the exact set of applications using the service. This leads to inefficiencies in provisioning, typically manifesting in under provisioning or over-provisioning of bandwidth for services. With under-provisioning of bandwidth on a service line, traffic ends up being dropped and affecting the application traffic. Over-provisioning is often done for critical applications but this leads to inefficient use of available resources.

Accordingly, there is a need for systems, apparatus, and methods that improve upon conventional approaches including the improved methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method includes: setting a first rate of data transport for each of a plurality of connections in a packet optical network, the packet optical network configured to transport data over the plurality of connections at the rate of data transport; monitoring a first amount of data being transported over the plurality of connections; computing, by a controller, a second rate of data transport for a Carrier Ethernet service based on the first amount of data being transported; setting the second rate of data transport for the Carrier Ethernet service; monitoring a second amount of data being transported over the plurality of connections; computing, by the controller, a third rate of data transport for the Carrier Ethernet service based on the second amount of data being transported; and setting the third rate of data transport for the Carrier Ethernet service.

In another aspect, an apparatus includes a first controller configured to: set a first rate of data transport for each of a plurality of connections in a packet optical network, the packet optical network configured to transport data over the plurality of connections at the rate of data transport; monitor a first amount of data being transported over the plurality of connections; compute a second rate of data transport for a Carrier Ethernet service based on the first amount of data being transported; set the second rate of data transport for the Carrier Ethernet service; monitor a second amount of data being transported over the plurality of connections; compute a third rate of data transport for the Carrier Ethernet service based on the second amount of data being transported; and set the third rate of data transport for the Carrier Ethernet service.

In still another aspect, a non-transient computer readable medium containing program instructions for causing a processor to perform a process that includes: setting a first rate of data transport for each of a plurality of connections in a packet optical network, the packet optical network configured to transport data over the plurality of connections at the rate of data transport; monitoring a first amount of data being transported over the plurality of connections; computing a second rate of data transport for a Carrier Ethernet service based on the first amount of data being transported; setting the second rate of data transport for the Carrier Ethernet service; monitoring a second amount of data being transported over the plurality of connections; computing a third rate of data transport for the Carrier Ethernet service based on the second amount of data being transported; and setting the third rate of data transport for the Carrier Ethernet service.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1A:
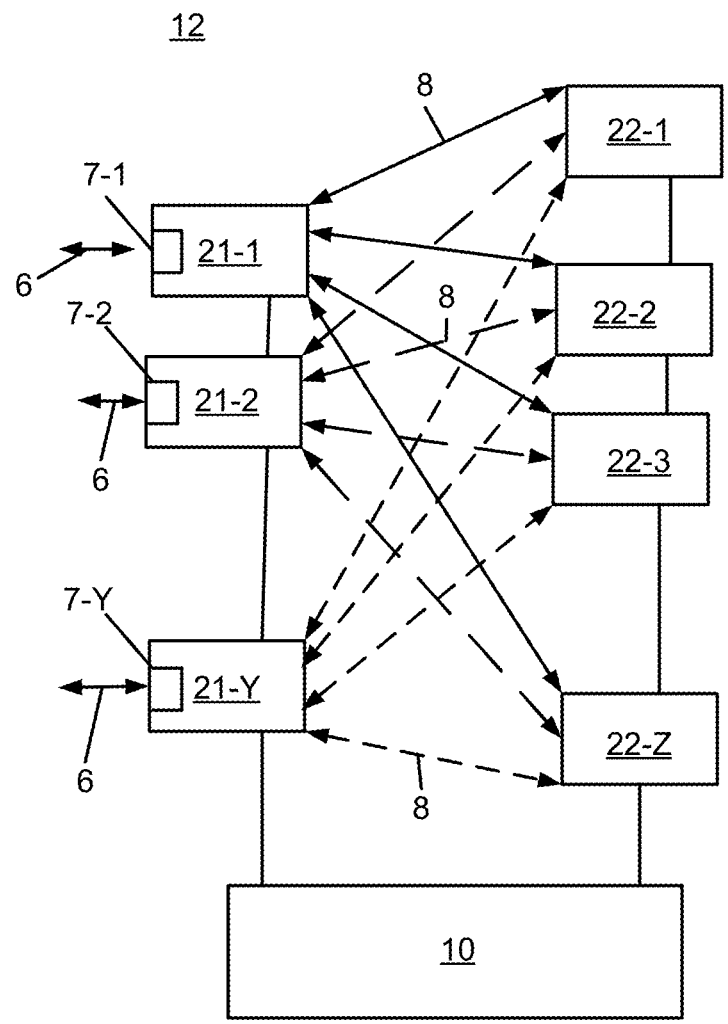
FIG. 1A illustrates an exemplary node of a network in accordance with some examples of the disclosure in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein advantageously address the industry needs, as well as other previously unidentified needs, and mitigate shortcomings of the conventional methods, apparatus, and systems. In some examples, the systems, methods, and apparatus herein determine the number of time slots to allocate for a network connection, monitor the time slot usage on that network connection, and re-allocate additional time slots (or reduce the allocated number) based on real time monitored usage of the time slots. For example, systems and methods for automatically managing the time slot requirements of application workloads may include learning the time slot requirements using historical data (e.g. a minute, an hour, a day, or a week of data), predicting the required time slots for a time interval and provisions the services to deliver the appropriate bandwidth to the applications. Systems and methods for automatically managing the time slot requirements of application workloads may also include monitoring for the actual time slot requirements of the applications and adapt dynamically to changing requirements (e.g. changes is service requirements, increased or decreased usage, network faults or outages, etc.).

FIG. 1A is a diagram of exemplary components of node 12. As shown in FIG. 1A, node 12 may include a controller 10 configurable to control the operation of the node 12 including connection admission (e.g. a software defined networking controller capable of connection admission control), line cards or modules 21-1, 21-2, . . . , 21-Y (referred to collectively as "line modules 21," and individually as "line module 21") (where Y>=1) connected to switching planes 22-1, 22-2, . . . 22-Z (referred to collectively as "switching planes 22," and individually as "switching plane 22") (where Z≥1). While FIG. 1A shows a particular number and arrangement of components, node 12 may include additional, fewer, different, or differently arranged components than those illustrated in FIG. 1A. Also, it may be possible for one of the components of node 12 to perform a function that is described as being performed by another one of the components. Node 12 may configured as a TDM capable optical switch, a router, a reconfigurable optical add/drop multiplexer (ROADM) such as Infinera's DTN-X packet optical transport capable switch, Infinera's EMXP packet-optical transport switch, or similar device configurable to provide Carrier Ethernet services. Node 12 may also be referred to as a device, such as a first device, a second device etc.

Line module 21 may include hardware components such as one or more ports 7-1, 7-2, . . . , 7-Y, or a combination of hardware and software components, that may provide network interface operations. Line module 21 may receive a multi-wavelength optical signal 6 and/or transmit a multi-wavelength optical signal 6 at the ports 7. A multi-wavelength optical signal 6 may include a number of optical signals of different optical wavelengths. In one implementation, line module 21 may perform retiming, reshaping, regeneration, time division multiplexing, and/or recoding services for each optical wavelength signal 6.

Switching plane 22 may include hardware components, or a combination of hardware and software components, that may provide switching functions to transfer data between line modules 21. In one implementation, switching plane 22 may provide fully non-blocking transfer of data. As to be explained below, switching plane 22 may be programmed to transfer data from a particular input port 6 to a particular output port 6.

As shown in FIG. 1A, each of line modules 21 may connect to each of switching planes 22 with a plurality of connections 8. The connections 8 between line modules 21 and switching planes 22 may be bidirectional. While a single connection 8 is shown between a particular line module 21 and a particular switching plane 22, the connection 8 may include a pair of unidirectional connections (i.e., one in each direction). A connection 8 from a line module 21 to a switching plane 22 will be referred to herein as an "ingress switch link," and a connection 8 from a switching plane 22 to a line module 21 will be referred to as an "egress switch link."

Figure 1B:
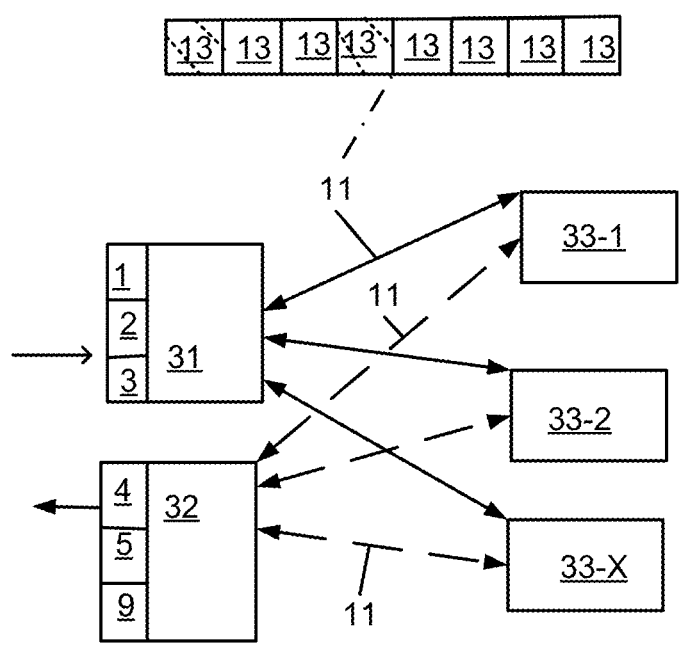
FIG. 1B illustrates an exemplary line module of the node in FIG. 1A in accordance with some examples of the disclosure.

FIG. 1B is a diagram of exemplary components of a line module 21. As shown in FIG. 1B, line module 21 may include a receiver (RX) photonic integrated circuit (PIC) 31 (e.g. a port 7-1), a transmitter (TX) PIC 32 (e.g. a port 7-2), and fabric managers (FMs) 33-1, 33-2, . . . , 33-X (referred to collectively as "FMs 33," and individually as "FM 33") (where X>=1). While FIG. 1B shows a particular number and arrangement of components, line module 21 may include additional, fewer, different, or differently arranged components than those illustrated in FIG. 1B. Also, it may be possible for one of the components of line module 21 to perform a function that is described as being performed by another one of the components.

Receiver PIC 31 may include hardware, or a combination of hardware and software, that may receive a multi-wavelength optical signal 6, separate the multi-wavelength signal 6 into signals of individual wavelengths, and convert the signals 6 to electrical (i.e. digital or analog) signals 11. In one implementation, receiver PIC 31 may include components, such as a photodetector 1, a demultiplexer 2, and/or an optical-to-electrical converter 3. Transmitter PIC 32 may include hardware, or a combination of hardware and software, that may convert signals 11 from digital form into a multi-wavelength optical signal 6, and transmit the multi-wavelength signal 6. In one implementation, transmitter PIC 32 may include components, such as an electrical-to-optical converter 4, a multiplexer 5, and/or a laser 9. As shown in FIG. 1B, receiver PIC 31 and transmitter PIC 32 may connect to each of FMs 33. Receiver PIC 31 may transfer signals 11 to FMs 33. Transmitter PIC 32 may receive signals 11 from FMs 33.

FM 33 may include hardware, or a combination of hardware and software, that may process digital signals 11 for transmission to switching plane 22 or transmitter PIC 32. In one implementation, FM 33 may receive a stream of signals 11 from receiver PIC 31 and divide the stream into time slots 13. In one implementation, each time slot 13 may include the same quantity of bytes (e.g., each time slot 13 may contain an equal amount of bandwidth). In another implementation, each time slot 13 may not include the same quantity of bytes (e.g., at least one time slot may contain a different amount of bandwidth). As can be seen in FIG. 1B, some time slots 13 are used (i.e. include a data payload in bits) and are shown with diagonal hash marks and others are not hashed indicating that they do not contain a payload or only default place holder bits. The stream of signals 11 received by FM 33 may, in one implementation, already be segmented into time slots 13, for example when the multi-wavelength optical signal 6 is received already divided into time slots 13. In this situation, when dividing the signals 11 into time slots 13, FM 33 may identify the time slots 13 based on, for examples, identifiers in the signals 11.

In one implementation, the quantity of time slots 13 may equal the quantity of switches available in switching planes 22. Assume, for example, that there are sixteen switches available in switching planes 22. In this case, FM 33 may divide the signals 11 into sixteen equal time slots 13. FM 33 may send each of the time slots 13 to a different one of the switches. In one implementation, FM 33 may sequentially send each of the time slots 13 in a round robin fashion. In another implementation, FM 33 may send out each of the time slots 13 in another systematic fashion.

Figure 1C:
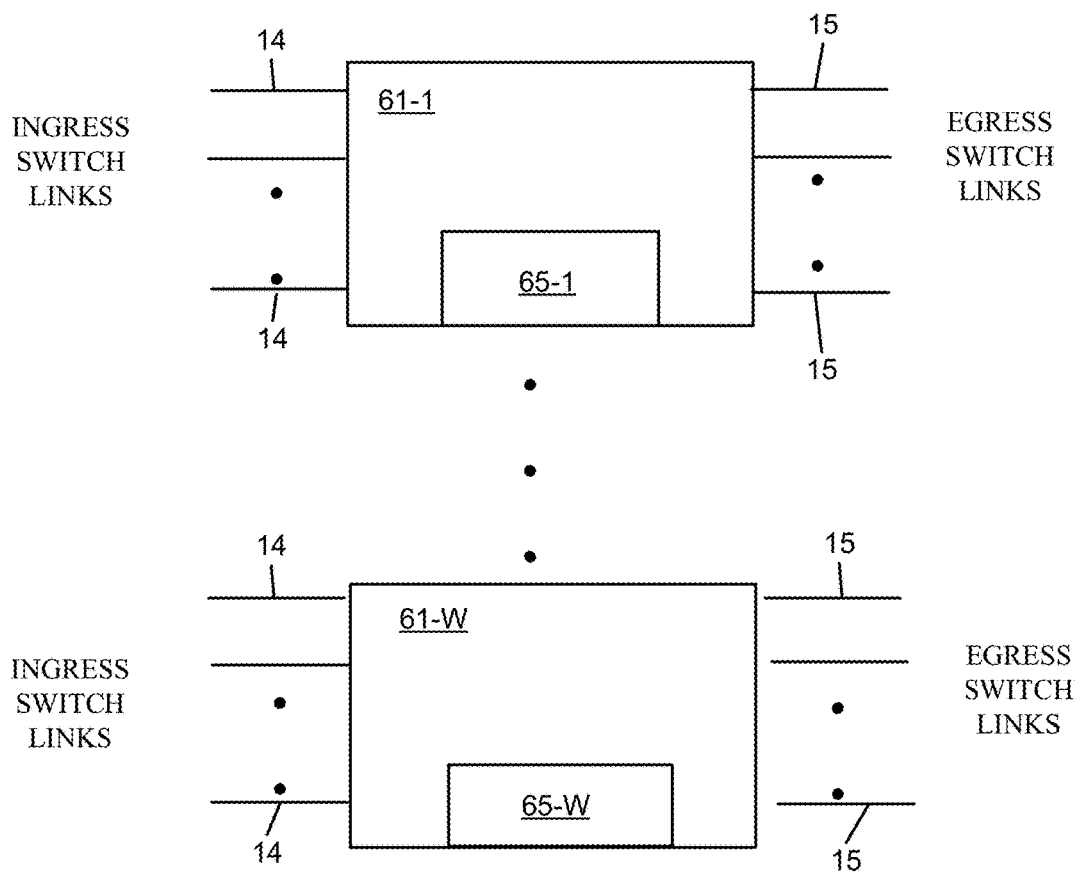
FIG. 1C illustrates an exemplary switch of the node in FIG. 1A in accordance with some examples of the disclosure.

FIG. 1C is a diagram of exemplary components of a switching plane 22. As shown in FIG. 1C, switching plane 22 may include switches 61-1, . . . , 61-W (referred to collectively as "switches 61," and individually as "switch 61") (where W≥1). While FIG. 1C shows a particular number and arrangement of components, switching plane 22 may include additional, fewer, different, or differently arranged components than those illustrated in FIG. 1C. Also, it may be possible for one of the components of switching plane 22 to perform a function that is described as being performed by another one of the components.

Switch 61 may include hardware, or a combination of hardware and software, that may transfer a received time slot 13 on an ingress switch link 14 to a time slot 13 on an egress switch link 15, where the time slot 13 on the ingress switch link 14 may differ from the time slot 13 on the egress switch link 15. Switch 61 may include a set of ingress switch links 14 via which time slots 13 are received, and a set of egress switch links 15 via which time slots 13 are transmitted. Each ingress switch link 14 and egress switch link 15 may connect to a particular FM 33.

Switch 61 may include a configuration database 65. Configuration database 65 may store mapping information that instructs switch 61 on which egress switch link 15 and in what time slot 13 to send a block of data received within a particular time slot 13 on a particular ingress switch link 14 along with information on what port 7 to use. The mapping information may be programmed by an operator of node 12 on a per node 12 basis, and may remain fixed until changed by the operator. Alternatively, the mapping information may be programmed under the control of a network-level routing and signaling algorithm, and may remain fixed until changed by the algorithm. In one implementation, each of switches 61 may store identical mapping information. In other words, each of switches 61 may be programmed to map time slot A on its ingress switch link B to time slot C on its egress switch link D.

In one implementation, configuration database 65 may store the mapping information in the form of a table, such as provided below.

| Egress Switch Link 15 | Egress Time slot 13 | Ingress Switch Link 14 | Ingress Time slot 13 |
|---|---|---|---|
| #8 | #14 | #1 | #10 |

This information may identify an ingress switch link 14 and ingress time slot 13 (e.g., a time slot 13 on the ingress switch link 14) for each egress switch link 15 and egress time slot 13 (e.g., a time slot 13 on the egress switch link 15). As shown, for example, the mapping information may map time slot #10 on ingress switch link #1 to time slot #14 on egress switch link #8.

Figure 1D:
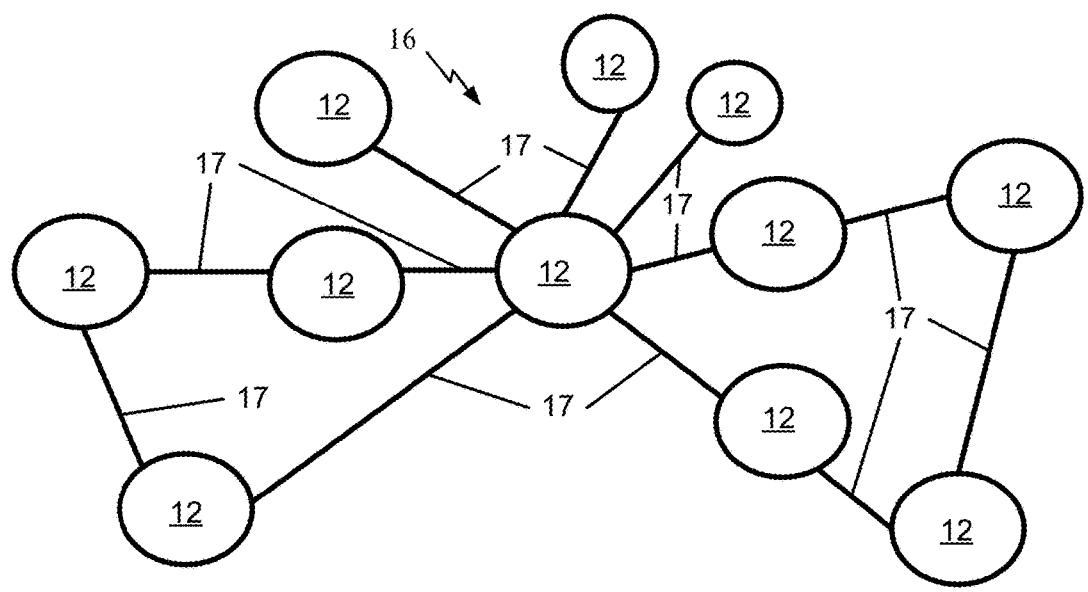
FIG. 1D illustrates an exemplary network configuration of the nodes in FIG. 1A in accordance with some examples of the disclosure.

FIG. 1D illustrates an exemplary network configuration of the nodes in FIG. 1A in accordance with some examples of the disclosure. As shown in FIG. 1D, an optical network 16 may include a plurality of nodes 12 interconnected by a plurality of connections 17. Each of the plurality of connections 17 may be configured to transport a plurality of multi-wavelength optical signals 6 having a plurality of time slots 13 or in another format. Each of the plurality of connections 17 may be, for example, a unidirectional or bi-direction medium such as an optical fiber capable of transporting an optical signal 6 or an electrical signal 11. The following examples describe apparatus and methods for use in conjunction with node 12.

The exemplary TDM capable node 12 described above may be used in conjunction with any of the following methods, apparatus, or systems described below to provide data transport services in Carrier Ethernet, for example. A Carrier Ethernet service is defined as a data communication service based on Carrier Ethernet which is delivered to a Carrier Ethernet Subscriber by a Carrier Ethernet Service Provider. Based on the goals of the 5 Carrier Ethernet attributes and the specifications developed by the Metro Ethernet Forum (MEF), Carrier Ethernet: delivers Ethernet frames between different locations in any part of the world at speeds between 1 Mbps and 100 Gbps, differentiates between traffic of multiple end-users running over a single network, runs over multiple types of infrastructure and transport technologies, and coexists with existing Layer 2 and Layer 3 solutions while taking advantage of the huge worldwide Ethernet installed base.

MEF-defined Carrier Ethernet (CE) services—E-Line, E-LAN, E-Tree and E-Access—are what users of Carrier Ethernet 'consume' and therefore are the most recognizable aspect of Carrier Ethernet and the work of the MEF. Carrier Ethernet services are defined in the MEF service definition specifications MEF 6.2, MEF 51, and MEF 33.

Figure 2A:
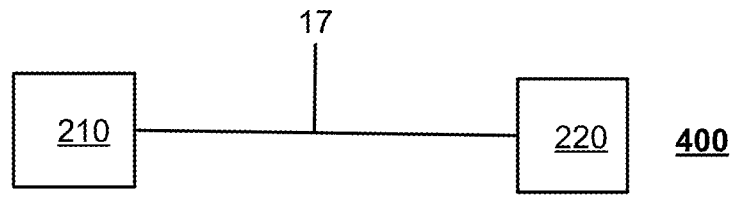
FIGS. 2A-C illustrate three service types of a Carrier Ethernet subscriber service in accordance with some examples of the disclosure.
Figure 2B:
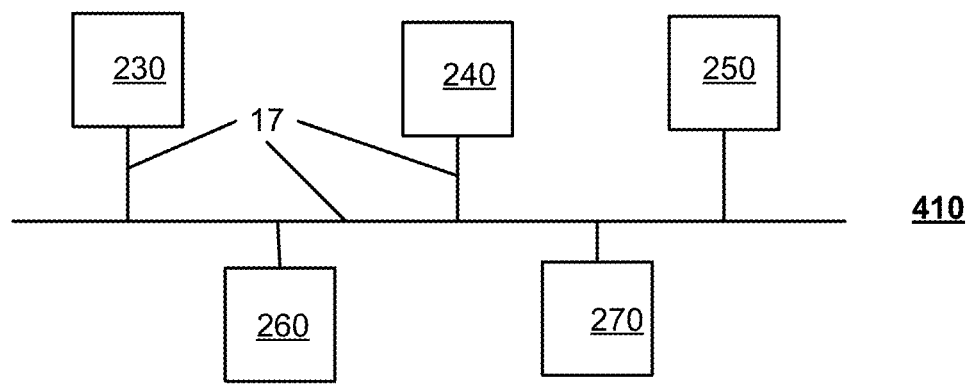
Figure 2C:
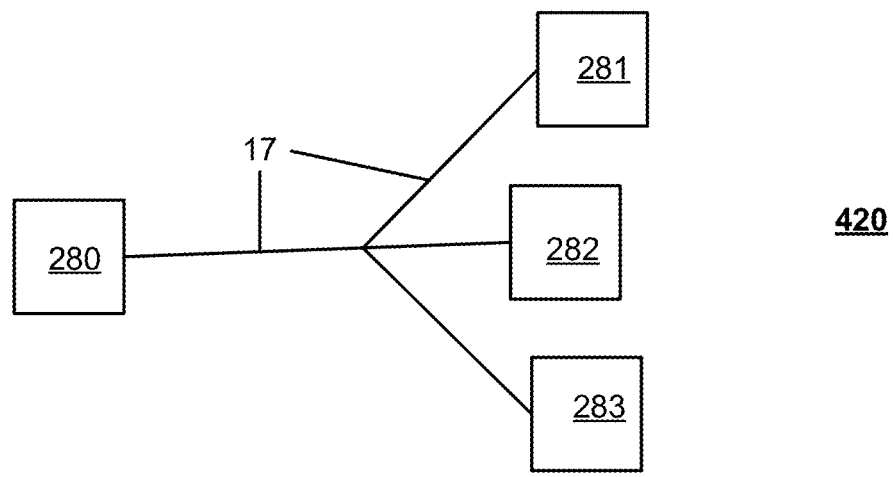

FIGS. 2A-C illustrate three Ethernet Virtual Connection (EVC) based service types (i.e. User Network Interface (UNI)-to-UNI) that describe the basic connectivity options of a Carrier Ethernet subscriber service in accordance with some examples of the disclosure. FIG. 2A illustrates an E-LINE configuration 400 that may provide a point 210 (UNI such as node 12) to point 220 (UNI such as node 12) connectivity over a connection 17. An E-LINE is a point-to-point Ethernet service that connects exactly 2 UNIs. Those 2 UNIs can communicate only with each other. E-LINES may be used to create Ethernet Private Lines, Ethernet Virtual Private Lines, and Ethernet Internet access. For example, E-LINES may be used to replace TDM private lines.

FIG. 2B illustrates an E-LAN configuration 410 that may provide a point 230 (UNI such as node 12) to many points 240-270 (UNIs such as nodes 12) connectivity over a plurality of connections 17. E-LAN services may be appropriate when all UNIs can generate traffic towards any other UNI and all UNIs belong to the same administrative domain—in other words when traffic separation between different organizations sharing the service is not required. An E-LAN is a multipoint-to-multipoint service that connects a number of UNIs (2 or more) providing full mesh connectivity for those sites. Each UNI can communicate with any other UNI that is connected to that Ethernet service. E-LANs may be used to create Multipoint L2 VPNs, Transparent LAN services, Layer 2 VPNs, and a foundation for IPTV and Multicast networks.

FIG. 2C illustrates an E-Tree configuration 420 that may provide a point 280 (UNI such as node 12) to many points 281-283 (UNIs such as nodes 12) connectivity over a plurality of connections 17. E-Tree services may be appropriate when the service source is located at just one UNI, or a small number of UNIs, each of which is designated a root UNI (point 280). The end-users of the service are typically client organizations that require that their respective traffic will not be visible to other clients of the service. An E-Tree is a rooted multipoint service that connects a number of UNIs providing sites with hub and spoke multipoint connectivity. Each UNI is designated as either root (point 280) or leaf (points 281-283). A root UNI can communicate with any leaf UNI, while a leaf UNI can communicate only with a root UNI. E-Trees provide the separation between UNIs required to deliver a single service instance in which different customers (each having a leaf UNI) connect to an ISP which has one or more root UNIs. Having more than one root UNI is useful for load sharing and resiliency schemes. E-Trees may be used to create Multicast delivery services, Internet access, Mobile backhaul services, and Telemetry services. In E-Lines and E-LANs, all UNIs are designated as a root UNI. In E-Tree, UNIs are designated either as root UNIs or as leaf UNIs. Root UNIs are used to source traffic that can be directed to any other UNI in the E-Tree. Those UNIs should be only able to see traffic that it originates in one of the root UNIs in the E-Tree that are designated as leaf UNIs. For example in an E-Tree used to provide access for multiple organizations to a single ISP, the ISP POP will sit at the root UNI, whereas each organization accessing the ISP sits at a leaf UNI so that it is unable to see traffic to and from other ISP clients. Multiple root UNIs are permitted in E-Trees in order to support mirror sites (resiliency) and load sharing configurations.

In a flexible bandwidth application, the requirement is to be able to adjust service bandwidth based on customer requests, and in the bandwidth calendaring application, the network operator specifies bandwidth limits on the service based on date and time. For example, the services could be defined to provide more bandwidth when utilization is low such as off-hours (flexible bandwidth). In another use-case, the services could be provisioned to be used at scheduled intervals (bandwidth calendaring). Herein bandwidth and time slot may be used interchangeably and a rate of data transport is a rate at which data is transported or to be transported in a network 16—the number of time slots 13 out of the total available time slots 13 on a connection 17 in the network 16. Thus, setting a rate of data transport for a Carrier Ethernet service means allocating a number of time slots 13 (unused time slots) out of the available time slots 13 (used and unused time slots 13 on a connection 17) for use by the Carrier Ethernet service to transport data in the network 16 where the rate is a ratio of allocated time slots (time slots allocated for use by the Carrier Ethernet service) to total number of available time slots on a connection (available time slots are both the used and unused time slots).

Figure 3:
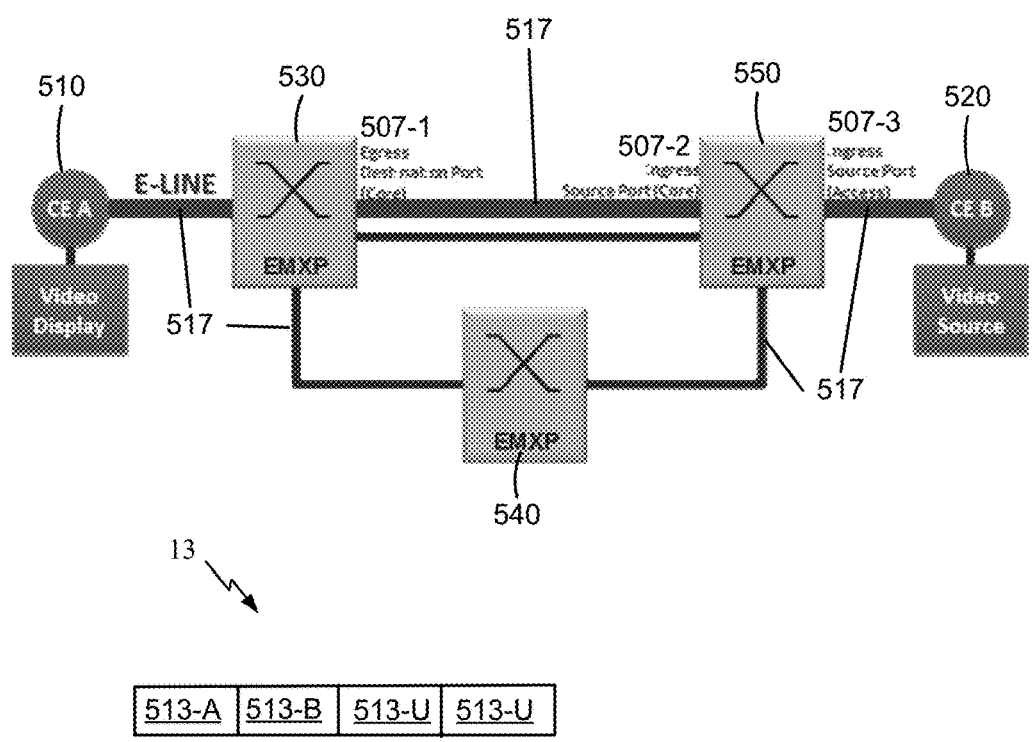
FIG. 3 illustrates an exemplary data transport service between two end points with video traffic in accordance with some examples of the disclosure.

FIG. 3 illustrates an exemplary data transport service between two end points 510 and 520 with video traffic in accordance with some examples of the disclosure. While this example discloses only discloses two end points 510 and 520, it should be understood that it may include more (E-Line, E-Tree, or E-Lan configuration). As shown in FIG. 3, an optical communication network 500 may include a first client device 510 (e.g. node 12 or similar) connected to a second client device 520 (e.g. node 12 or similar) through the network 500 over a plurality of connections 517 (e.g. connections 17). The network 500 may include a first network device 530 (e.g. node 12 or similar) connected to the first client device 510 in an E-LINE configuration over a connection 517. While the description describes an E-LINE configuration, it should be understood that the configuration used may also be a E-TREE configuration, E-LAN configuration, and to provision bandwidth for any type of Virtual Private Network (VPN) services such as Virtual Private Wire Service (VPWS), Virtual Private LAN Service (VPLS), and Ethernet VPN (EVPN). The first network device 530 is interconnected to a second network device 540 (e.g. node 12 or similar) and a third network device 550 (e.g. node 12 or similar) over connections 517. The network 500 may be used to provide automatic time slot management including: (1) learning time slot requirements based on application workloads, (2) prediction of time slot requirement based on the workload history, (3) provisioning and management of services based on predicted time slot demand, and (4) monitoring and adapting to changes in application workloads. Learning time slot requirements based on application workloads.

As shown in FIG. 3, three network devices 530-550 may be provisioned with an E-LINE service between two client devices 510 and 520. While three network devices 530-550 are shown, it should be understood that more or less devices may be used. The provisioned service is responsible for carrying video (or data) traffic between two sites, and the video application would necessarily have varying time slot requirements. Once the operator (or the paying customer) decides the maximum amount of time slot that the application would requirement, one exemplary method described below may be used to automatically provision the E-LINE service with the appropriate time slot carrying capacity. First, the network 500 (e.g. a centralized controller or any of network devices 530-550 may automatically learn the time slot 13 demand in the network 500. On every network device 530-550 or at least one, the traffic history is monitored to learn the time slot 13 demand on a per-port basis, such as an egress destination port 507-1 (e.g. port 7-1), a ingress source port 507-2 (e.g. port 7-2), and a ingress source port 507-3 (e.g. port 7-Y). Also illustrated in FIG. 3 is a plurality of time slots 13 (i.e. a traffic stream) with some time slots being used, such as with an Application/Flow-ID 513-A, or a Timestamp 513-B and others unused (time slots 513-U). To learn the application demand, one exemplary method involves monitoring the following parameters:

Application/Flow-ID 513-A—This is an identifier for a traffic stream. We assume Application/Flow-ID can be used to identify the type of service/traffic (e.g.: video stream, chat, analytics, etc.) using a lookup table the target environment may provide.

Ingress/Source port 507-3—The port (physical or logical) through which the traffic enters the third network device 550 from the second client device 520.

Ingress/Source port 507-2—The port (physical or logical) through which the traffic leaves the third network device 550.

Egress/Destination port 507-1—The port (physical or logical) through which the traffic enters the first network device 530 from the network 500.

Provisioned time slot 13—This is the provisioned demand for time slot 13 for the given traffic stream.

Timestamp 513-B—A discrete value of time for which the traffic parameters are measured.

From historical data of the above grouped parameters, the rate of change C of utilized time slot 13 with respect to the provisioned time slot 13 per port per flow may be learned over a period of time as under:

$$C(t)=d(Bw)/dt \qquad \text{(Equation 1)}$$

where Bw (t)=$F_t$ (flow data rate, provisioned time slot 13, total utilized time slot 13)

The period of time of the historical data may vary depending on numerous factors. For example, the length of historical data used may be a function of network scale, and how soon the system converges to an acceptable forecast. If, for instance, there is a weekly pattern to the setup and use of time slot 13 services such as backup of data every week, the system may be configured to monitor the data for a month to decipher some acceptable pattern.

Flow data rate is computed using the difference in received and transmitted packets across a flow over time. Total utilized time slot 13—This is the actual demand for time slot 13 for the given traffic stream aggregated over all the flows based on the ingress/egress port combination:

$$\text{Total Utilized Time slot 13}=\Sigma_{k=0}^{n} \text{flow data rate}(k), \qquad \text{(Equation 2)}$$

k being the flow ID

Prediction of time slot 13 requirement based on the workload history may use linear or non-linear regression analysis based on progression characteristics on the variable C(t) as described above. This may allow any of the network devices 530-550 to derive the correlation function Ft binding utilized time slot 13 with provisioned time slot 13 over a period of time:

$$Fte \approx R(C(t)) \qquad \text{(Equation 3)}$$

where R is the regression function, and e is the coefficient of error

This correlation function may enable the network devices 530-550 to predict/forecast the value of C(t) for a point (or range) of time in the future. The value of e may be minimized by using a sufficiently large historical dataset to train the regression model. For example:
(1) Let t0 be the start of sampling period of historical data and tmax be the end.
(2) This enables predicting the value of Fte for the time period t0' to tmax'.
(3) For k=1 through n//Overall Flow IDs
  (A) For t=[t0' to tmax'.]
    (i) Bw(k)=COMPUTE(Fte, k)//Using Equation (3).
    (ii) If emin<e<emax//emin and emax may be user defined thresholds of error
      (a) Go to Step 4.
    (iii) Else Go to Step 3.A.i and refine the time slot 13
(4) Compute (total utilized time slot 13) using Equation (2) and Bw(k) for all flows k.

Any of network devices 530-550 or a centralized controller (not shown) may provision and manage services based on predicted time slot 13 demand. The actual provisioning of services with appropriately predicted time slot 13 depends on the individual network device implementation (i.e. provisioning by a router may differ from a ROADM, for example). For instance, this could be accomplished with the help of a Software Defined Network (SDN) controller (e.g a centralized controller) that configures and manages a traditional E-LINE configuration on network devices such as routers. One example may use the REST APIs published by the Infinera Service Mediator to provision appropriate VPN services on the managed devices. Another implementation may use the Infinera OTS framework for provisioning the time slot 13 services. In order to prevent a repetitive re-provisioning of the time slot 13 and prevent transient traffic losses, the following guidelines may be used by the network devices or SDN controller.

Ensure make before break approach in provisioning time slot 13.

Overprovision time slot 13 by a small factor (may be user or operator defined) to accommodate for errors in predicted values.

Quickly normalize the time slot 13 to optimum levels using hysteresis. In other words, do not let the predicted time slot 13 fluctuate a great deal within a short amount of time.

Any of network devices 530-550 or a centralized controller (e.g. controller 10) may monitor and adapt to changes in application workloads using the regression model to auto-tune itself. Once this application is "plugged-in" to a live network environment, a feedback loop of parameters mentioned previously will be continuously compared against the predicted value for that point of time. If the difference between the actual and predicted values exceed a threshold (which may be derived empirically from historical data), the correlation function Fte will be recomputed. Thus, the regression model will account for any change in the network characteristic related to time slot 13 and enable optimal time slot 13 utilization. Since the process may be configured to run on an independent compute environment, brute force statistical/machine learning methodologies may be applied without affecting network performance.

Figure 4:
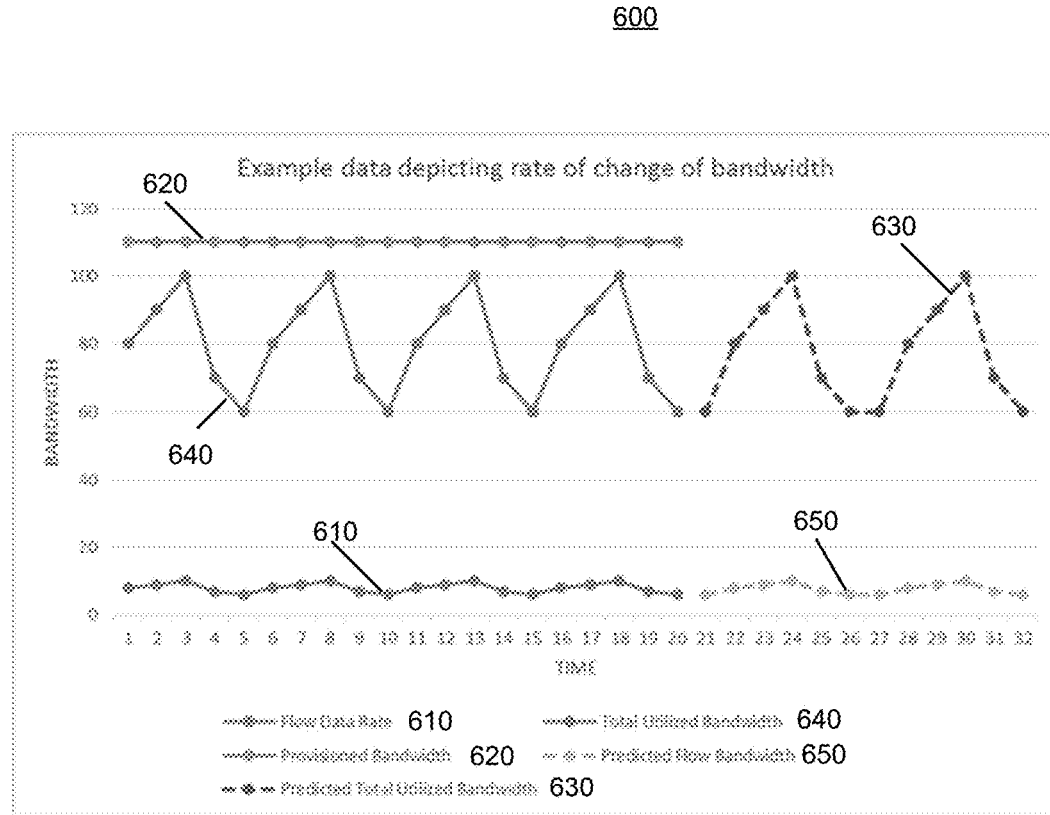
FIG. 4 illustrates bandwidth prediction based on work load history in accordance with some examples of the disclosure.

FIG. 4 illustrates time slot 13 prediction based on work load history in accordance with some examples of the disclosure. As shown in FIG. 4, flow rate and time slot 13 are depicted for sample data 600 depicting the rate of change of time slot 13. The flow data rate 610, the provisioned bandwidth 620, the predicted total utilized bandwidth 630, the total utilized bandwidth 640, and the predicted flow bandwidth 650 are shown fluctuating over time.

The systems and methods described herein for automated time slot 13 management of application workloads may lead to (a) better utilization of resources in the network leading to lower CAPEX/OPEX, (b) adapt dynamically to changing application requirements and therefore, improve the application response times, (c) simplify the service management by eliminating the need for manual management of time slot 13 services, and (d) automatically identify and flag anomalous traffic patterns that could ultimately help in quickly identifying and responding to security and failure scenarios. Also, other learning algorithms may be adapted and used in addition to the processes disclosed herein.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium (transient and non-transient) having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Further, those of skill in the art will appreciate that the various illustrative logical blocks, modules, circuits, and algorithm steps described in connection with the examples disclosed herein may be implemented as electronic hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method comprising:
    setting a first rate of data transport for each of a plurality of connections in a packet optical network, the packet optical network configured to transport data over the plurality of connections at the rate of data transport;
    monitoring a first amount of data being transported over the plurality of connections;
    computing, by a controller, a second rate of data transport for a Carrier Ethernet service based on the first amount of data being transported;
    setting the second rate of data transport for the Carrier Ethernet service;
    monitoring a second amount of data being transported over the plurality of connections;
    computing, by the controller, a third rate of data transport for the Carrier Ethernet service based on the second amount of data being transported; and
    setting the third rate of data transport for the Carrier Ethernet service.

2. The method of claim 1, wherein the monitoring the first amount of data being transported further comprises monitoring the first amount of data being transported on a plurality of device ports of the plurality of connections.

3. The method of claim 2, wherein the setting the second rate of data transport for the Carrier Ethernet service further comprises setting the second rate of data transport for the Carrier Ethernet service for each of the plurality of device ports.

4. The method of claim 1, wherein the monitoring the first amount of data being transported further comprises monitoring an application identifier, a first port of a first device of a plurality of device ports configured to input data, and a first port of a second device of the plurality of device ports configured to output data.

5. The method of claim 4, wherein the monitoring the second amount of data being transported further comprises monitoring the application identifier, the first port of the first device, and the first port of the second device.

6. The method of claim 5, wherein the controller is incorporated into one of the first device, the second device, or a remote server.

7. The method of claim 6, wherein at least one of the first device or the second device is configured as a reconfigurable optical add drop multiplexer or a packet based switch.

8. An apparatus comprising:
    a first controller configured to:
        set a first rate of data transport for each of a plurality of connections in a packet optical network, the packet optical network configured to transport data over the plurality of connections at the rate of data transport;
        monitor a first amount of data being transported over the plurality of connections;
        compute a second rate of data transport for a Carrier Ethernet service based on the first amount of data being transported;
        set the second rate of data transport for the Carrier Ethernet service;
        monitor a second amount of data being transported over the plurality of connections;
        compute a third rate of data transport for the Carrier Ethernet service based on the second amount of data being transported; and
        set the third rate of data transport for the Carrier Ethernet service.

9. The apparatus of claim 8, wherein the controller is further configured to monitor the first amount of data being transported on a plurality of device ports of the plurality of connections.

10. The apparatus of claim 9, wherein the controller is further configured to set the second rate of data transport for the Carrier Ethernet service for each of the plurality of device ports.

11. The apparatus of claim 8, wherein the controller is further configured to monitor an application identifier, a first port of a first device of a plurality of device ports configured to input data, and a first port of a second device of the plurality of device ports configured to output data.

12. The apparatus of claim 11, wherein the controller is further configured to monitor the application identifier, the first port of the first device, and the first port of the second device.

13. The apparatus of claim 12, wherein the controller is incorporated into one of the first device, the second device, or a remote server.

14. The apparatus of claim 13, wherein at least one of the first device or the second device is configured as a reconfigurable optical add drop multiplexer or a packet based switch.

15. A non-transient computer readable medium containing program instructions for causing a processor to perform a process comprising:
    setting a first rate of data transport for each of a plurality of connections in a packet optical network, the packet optical network configured to transport data over the plurality of connections at the rate of data transport;
    monitoring a first amount of data being transported over the plurality of connections;
    computing a second rate of data transport for a Carrier Ethernet service based on the first amount of data being transported;
    setting the second rate of data transport for the Carrier Ethernet service;
    monitoring a second amount of data being transported over the plurality of connections;
    computing a third rate of data transport for the Carrier Ethernet service based on the second amount of data being transported; and
    setting the third rate of data transport for the Carrier Ethernet service.

16. The non-transient computer readable medium of claim 15, wherein the monitoring the first amount of data being transported further comprises monitoring the first amount of data being transported on a plurality of device ports of the plurality of connections.

17. The non-transient computer readable medium of claim 16, wherein the setting the second rate of data transport for the Carrier Ethernet service further comprises setting the second rate of data transport for the Carrier Ethernet service for each of the plurality of device ports.

18. The non-transient computer readable medium of claim 15, wherein the monitoring the first amount of data being transported further comprises monitoring an application identifier, a first port of a first device of a plurality of device ports configured to input data, and a first port of a second device of the plurality of device ports configured to output data.

19. The non-transient computer readable medium of claim 18, wherein the monitoring the second amount of data being transported further comprises monitoring the application identifier, the first port of the first device, and the first port of the second device.

20. The non-transient computer readable medium of claim 19, wherein the processor incorporated into one of the first device, the second device, or a remote controller.

\* \* \* \* \*